(12) United States Patent  (10) Patent No.: US 8,864,185 B2
Do  (45) Date of Patent: Oct. 21, 2014

(54) LATCH WITH ADJUSTABLE HANDLE

(75) Inventor: Thai Do, Laguna Niguel, CA (US)

(73) Assignee: Alcoa Inc., Pittsburgh, PA (US)

( * ) Notice: Subject to any disclaimer, the term of this patent is extended or adjusted under 35 U.S.C. 154(b) by 439 days.

(21) Appl. No.: 13/043,717

(22) Filed: Mar. 9, 2011

(65) Prior Publication Data

US 2011/0227350 A1  Sep. 22, 2011

Related U.S. Application Data

(60) Provisional application No. 61/340,529, filed on Mar. 18, 2010.

(51) Int. Cl.
| | |
|---|---|
| E05C 19/10 | (2006.01) |
| E05C 19/14 | (2006.01) |
| B64C 1/14 | (2006.01) |
| E05C 5/00 | (2006.01) |
| E05C 19/12 | (2006.01) |
| B64D 29/06 | (2006.01) |

(52) U.S. Cl.
CPC ............. *E05C 19/145* (2013.01); *B64C 1/1446* (2013.01); *B64D 29/06* (2013.01); *Y10S 292/31* (2013.01); *Y10S 292/49* (2013.01); *Y10S 292/60* (2013.01)
USPC ...... 292/105; 292/95; 292/113; 292/DIG. 31; 292/DIG. 49; 292/DIG. 60

(58) Field of Classification Search
CPC ......... E05C 5/04; E05C 19/189; E05C 19/10; E05C 19/14; E05C 19/145
USPC .................. 292/109, 110, 113, 116, 118, 121, 292/DIG. 31, DIG. 60, 251
See application file for complete search history.

(56) References Cited

U.S. PATENT DOCUMENTS 2,712,955 A * 7/1955 Andrews ........................ 292/113
2,904,141 A * 9/1959 Henrichs ........................ 403/321

(Continued)

FOREIGN PATENT DOCUMENTS

DE  202220 B  9/1908
DE  29807738 U1  7/1998

(Continued)

OTHER PUBLICATIONS

International Search Report and Written Opinion in connection with International Patent Application No. PCT/US2012/059206 "Rotary-Handle Latch" dated Jan. 18, 2013 (9 pages).

(Continued)

*Primary Examiner* — Kristina Fulton
*Assistant Examiner* — Faria Ahmad
(74) *Attorney, Agent, or Firm* — Greenberg Traurig LLP

(57) ABSTRACT

A latch includes a body having first end and a second end, a trigger-catch-pin, and a pin adjustment mechanism for adjusting the position of the trigger-catch-pin within the body. The latch includes a handle having a first end and a second end, an exterior surface, and a trigger. The second end of the handle is attached pivotally to the body such that the handle is moveable between a closed position, in which the trigger of the handle is releasably engaged with the trigger-catch-pin, and an open position, in which the trigger of the handle is disengaged from the trigger-catch-pin. The pin adjustment mechanism is adapted to adjust the position of the trigger-catch-pin within the body and, in turn, the position of the first end of the handle relative to the body, so that the exterior surface of the handle may be positioned flush with an exterior surface of an external structure.

11 Claims, 3 Drawing Sheets

(56) References Cited

U.S. PATENT DOCUMENTS

| | | | | |
|---|---|---|---|---|
| 2,927,812 | A | * | 3/1960 | Smith et al. .................. 292/196 |
| 3,259,411 | A | * | 7/1966 | Griffiths ........................ 292/113 |
| 3,259,412 | A | * | 7/1966 | Wheeler ....................... 292/113 |
| 3,473,693 | A | * | 10/1969 | Fritz ............................. 220/314 |
| 4,053,177 | A | | 10/1977 | Stammreich et al. |
| 4,116,479 | A | * | 9/1978 | Poe ............................... 292/113 |
| 4,183,564 | A | * | 1/1980 | Poe ............................... 292/113 |
| 4,220,364 | A | * | 9/1980 | Poe ......................... 292/341.18 |
| RE31,935 | E | * | 7/1985 | Poe ............................... 292/113 |
| 4,530,529 | A | * | 7/1985 | Poe et al. ...................... 292/113 |
| 4,602,812 | A | * | 7/1986 | Bourne ......................... 292/113 |
| 4,828,299 | A | | 5/1989 | Poe |
| 4,858,970 | A | * | 8/1989 | Tedesco et al. ............... 292/113 |
| 5,152,926 | A | * | 10/1992 | Brown ............................. 252/68 |
| 5,609,373 | A | * | 3/1997 | Gromotka ..................... 292/229 |
| 5,620,212 | A | * | 4/1997 | Bourne et al. ................ 292/113 |
| 5,660,295 | A | * | 8/1997 | Hroma et al. ................. 220/324 |
| 5,664,813 | A | * | 9/1997 | Gromotka ..................... 292/229 |
| 5,984,382 | A | * | 11/1999 | Bourne et al. ................ 292/113 |
| 6,123,370 | A | | 9/2000 | Rozema |
| 6,343,815 | B1 | * | 2/2002 | Poe ............................... 292/113 |
| 6,755,448 | B2 | * | 6/2004 | Jackson et al. ................ 292/113 |
| 6,913,297 | B2 | | 7/2005 | Jackson |
| 7,156,429 | B2 | * | 1/2007 | Eriksson ....................... 292/247 |
| 2005/0087996 | A1 | | 4/2005 | Jackson et al. |
| 2011/0109103 | A1 | | 5/2011 | Huston et al. |
| 2012/0102842 | A1 | * | 5/2012 | Fournie et al. ................... 49/503 |
| 2012/0151724 | A1 | * | 6/2012 | Defrance et al. ............. 24/601.5 |

FOREIGN PATENT DOCUMENTS

| | | |
|---|---|---|
| EP | 1091059 A2 | 4/2001 |
| EP | 2031157 E | 4/2009 |
| FR | 2397503 E | 7/1977 |
| FR | 2852049 A1 | 4/2003 |
| GB | 191493 | 1/1925 |
| GB | 1497982 A | 1/1978 |
| GB | 1537410 A | 12/1978 |
| WO | 2010/033026 B | 3/2010 |
| WO | 2010/149905 A1 | 12/2010 |

OTHER PUBLICATIONS

International Search Report and Written Opinion in connection with International Patent Application No. PCT/US2012/066039 "Pin Latch With Detection Device and Movable Catch-Pin and Intermediate Position With Automatic Return Mechanism" dated Feb. 25, 2013 (15 pages).

International Search Report and Written Opinion in connection with International Patent Application No. PCT/US2011/024031 "Side-Driven Action Pin Latch" (11 pages).

International Search Report and Written Opinion in connection with International Patent Application No. PCT/US2012/028418 "Pin Latch Having Intermediate Position" (13 pages).

Fairchild Fasteners, Aerospace Mechanisms, "RAM" Aerospace Latch Mechanism, 2004 (4 pages).

Rotary Latch #TL18261 Alcoa Fastening Systems, Mar. 2005 (1 page).

Commonly owned U.S. Appl. No. 13/043,717 "Latch With Adjustable Handle", filed Mar. 9, 2011 (18 pages).

Commonly owned U.S. Appl. No. 13/023,081 "Side-Driven Action Pin Latch", filed Feb. 8, 2011 (25 pages).

Commonly owned U.S. Appl. No. 13/285,323 "Rotary Handle Latch", filed Oct. 31, 2011 (31 pages).

International Search Report and Written Opinion for International Patent Application No. PCT/US2011/027871 entitled Latch With Adjustable Handle (10 pages).

An English-language translation of WO 2010/149905 A1 (8 pages).

* cited by examiner

LATCH WITH ADJUSTABLE HANDLE

CROSS-REFERENCE TO RELATED APPLICATION

This application is a Section 111(a) application relating to and claims the benefit of commonly owned, U.S. Provisional Application Ser. No. 61/340,529 entitled "ADJUSTABLE HANDLE HOOK LATCH," filed Mar. 18, 2010, the entirety of which is incorporated herein by reference.

FIELD OF THE INVENTION

The present invention relates to a latch, and, more particularly, to a latch having an adjustable handle.

BACKGROUND OF THE INVENTION

Vehicles exposed to high velocity air flows, such as aircraft, have exterior surfaces that are shaped to minimize aerodynamic drag. Removable elements that are installed in the exterior surfaces of the vehicles, such as access panels, engine cowlings, radomes and the handles/latches attached to the elements, are also shaped and installed to minimize aerodynamic drag. At least one latch is normally fitted to the removable element to secure the element to a keeper (i.e., a receptacle with a keeper-pin located in the body of the vehicle). A handle mounted on the latch is used to open or close the element. In order to minimize aerodynamic drag, the handle is preferably positioned flush with the surface of the element when it is in the closed position.

SUMMARY OF THE INVENTION

In an embodiment, a latch includes a body having a first end and a second end opposite the first end, a trigger-catch-pin, and an pin adjustment mechanism for adjusting the position of the trigger-catch-pin within the body, and a handle having a first end and a second end opposite the first end of the handle, an exterior surface, and a trigger. In an embodiment, the second end of the handle is attached pivotally to the body such that the handle is moveable between a closed position, in which the trigger of the handle is releasably engaged with the trigger-catch-pin of the body, and an open position, in which the trigger of the handle is disengaged from the trigger-catch-pin of the body. In an embodiment, when the handle is in its closed position, the pin adjustment mechanism is adapted to adjust the position of the trigger-catch-pin within the body and, in turn, the position of the first end of the handle relative to the body.

In an embodiment, the latch is adapted to be mounted to a structure, and the pin adjustment mechanism is adapted to adjust the handle so that the exterior surface of the handle is flush with an external surface of the structure. In an embodiment, the pin adjustment mechanism is an adjustable screw threadedly attached to the body. In an embodiment, when the adjustable screw is rotated threadedly in a first direction, the first end of the handle is urged towards the body, and when the adjustable screw is rotated threadedly in a second direction opposite the first direction, the first end of the handle travels away from the body. In an embodiment, the trigger of the handle includes a top portion having an access hole formed therein for providing external access to the adjustable screw. Such access permits a user to insert a wrench or other suitable tool from the exterior of the latch into the head of the adjustable screw. In this manner, the exterior surface of the handle may be adjusted to be oriented flush with the exterior surface of the structure.

In an embodiment, the body of the latch includes a hook member extending from the second end of the body. In an embodiment, the hook member includes a threaded shaft attached threadedly to the second end of the body. In an embodiment, the body includes a hook adjustment mechanism for movably adjusting the hook member between an extended position and a retracted position.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE EXEMPLARY EMBODIMENT

In one or more embodiments, although the present invention can be used in conjunction with latches installed on any type of removable element, it is particularly suitable for use in connection with removable elements of aircraft, such as access panels, nacelles, engine cowlings, or radomes. Accordingly, the present invention will be described hereinafter in connection with such removable elements. It should be understood, however, that the following description is only meant to be illustrative of the present invention and is not meant to limit the scope of the present invention, which has applicability with other types of removable or moveable elements and other types of vehicles and structures.

Figure 1:
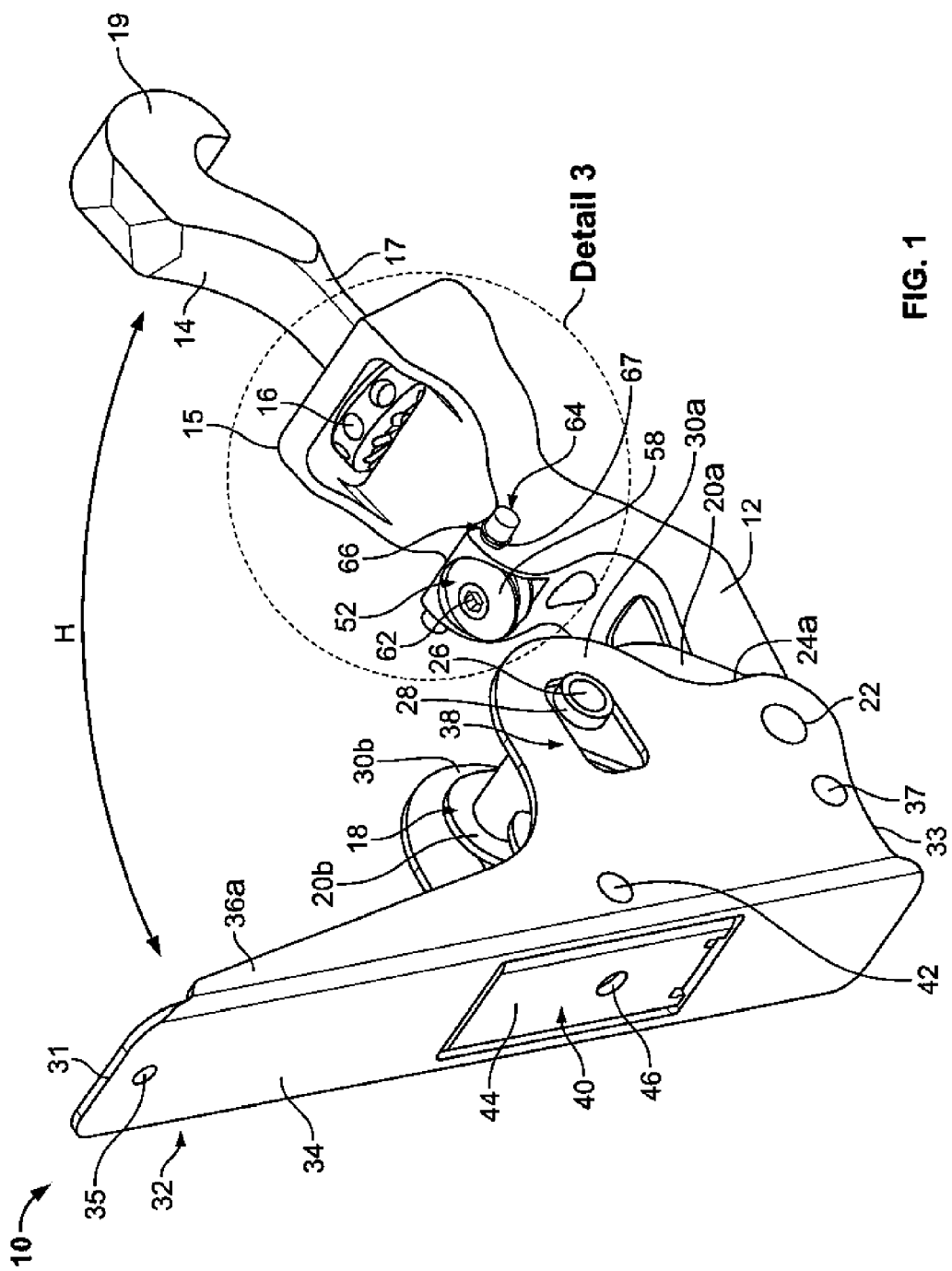
FIG. 1 is a top perspective view of a latch constructed in accordance with an embodiment of the present invention, the latch being shown in an open position.
Figure 2:
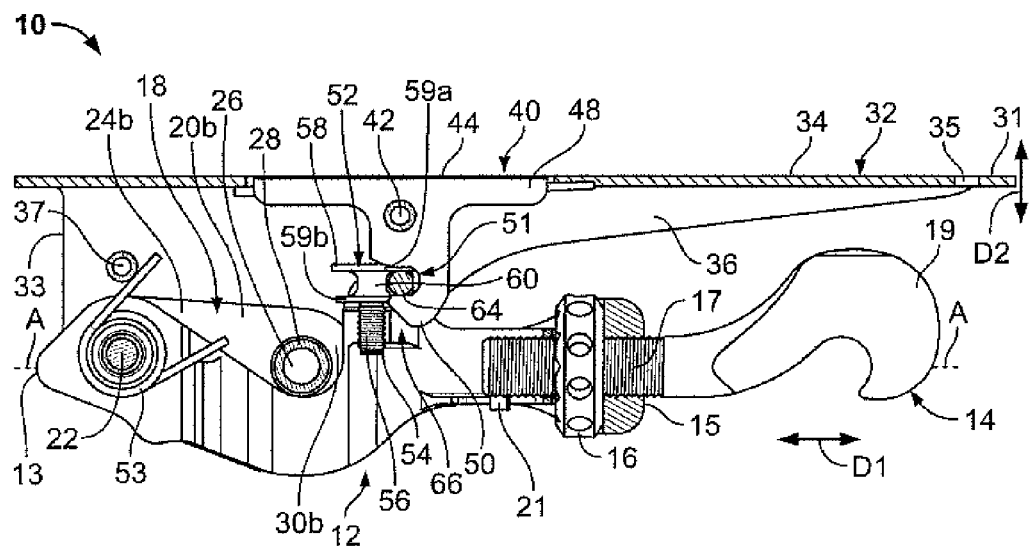
FIG. 2 is a partial cross-sectional view of the latch shown in FIG. 1, the latch being shown in a closed position.

FIGS. 1 and 2 illustrate a latch 10 constructed in accordance with an embodiment of the present invention. In an embodiment, the latch 10 includes a body 12 having a first end 13 and a second end 15 opposite the first end 13. In an embodiment, a hook member 14 is connected to the second end 15 of the body 12 by an adjustment mechanism 16. In an embodiment, the adjustment mechanism 16 is an adjustable nut. In an embodiment, the hook member 14 includes a threaded shaft 17 and a hook head 19 extending therefrom. In an embodiment, the threaded shaft 17 of the hook member 14 threadedly engages the adjustment mechanism 16. In an embodiment, by turning the adjustment mechanism 16, the position of the hook head 19 may be adjusted linearly (i.e., extended from or retracted towards the body 12) along a longitudinal axis A-A of the body 12 in directions D1 so that the hook head 19 may latch onto and off a keeper pin (not shown in the Figures). In an embodiment, the adjustment mechanism 16 facilitates the adjustment of the latch preload and handle force. In an embodiment, the threaded shaft 17 and the axis A-A is in line with a load line imparted on the body 12 for load carrying, weight, and endurance. In an embodiment, the adjustment mechanism 16 includes an anti-rotation feature for vibration resistance. In an embodiment, a locking mechanism 21 engages the threaded shaft 17 to maintain the hook member's 14 position (see FIG. 2). In other embodiments, the latch 10 may employ other adjustment mechanisms known in the art to facilitate extending and retracting the hook member 14. In an embodiment, the hook member 14 may be adjusted linearly in a range of approximately ±0.15 inch (±3.8 mm) along the axis A-A. In other embodiments, the hook member 14 may be adjusted in a range greater or less than ±0.15 inch. In an embodiment, the hook member 14 is adjustable only when the latch 10 is in its open position for safety purposes.

With continued reference to FIGS. 1 and 2, in an embodiment, the latch 10 includes a link 18 positioned proximate to the first end 13 of the body 12 and having two opposing sides 20a, 20b. In an embodiment, hook handle pivot pins 22 are mounted within free ends 24a, 24b of the sides 20a, 20b, respectively, and a mounting bolt 26 having mounting bushings 28 are positioned at fixed ends 30a, 30b of the sides 20a, 20b, respectively. In an embodiment, the fixed ends 30a, 30b of the link 18 are pivotally mounted to a removable element, such as an access panel of a vehicle by the mounting bolt 26 (not shown in the Figures).

Still referring to FIGS. 1 and 2, in an embodiment, the latch 10 includes a handle 32 pivotally attached to the link 18 by the pivot pins 22. In an embodiment, the handle 32 includes a first end 31 and a second end 33 opposite thereof, an exterior surface 34, and opposing sides 36a, 36b. In an embodiment, the exterior surface 34 includes an aperture 35 formed therein for receiving a force gauge. In an embodiment, a post 37 interconnects the opposing sides 36a, 36b of the handle 32. In an embodiment, each of the sides 36a, 36b of the handle 32 includes a slot 38 (see FIG. 1), while the exterior surface 34 of the handle 32 includes a trigger 40 pivotally mounted therein by a trigger pivot pin 42. In an embodiment, the trigger 40 includes a top portion 44 having an exterior surface with an access hole 46 formed therein, and whose purpose shall be described hereinafter. In an embodiment, a detent 48 with a cupped tip 50 and a slot 51 depends from the top portion 44 of the trigger 40 (see FIG. 2). In an embodiment, the trigger 40 controls the operation of the handle 32, which is discussed in greater detail hereinbelow.

With continued reference to FIGS. 1 and 2, in an embodiment, the first end 13 of the body 12 is pivotally attached to the second end 33 of the handle 32 by the pivot pins 22. In an embodiment, a back spring 53 surrounds each of the pivot pins 22 an engages the post 37 for biasing the body 12 and the handle 32 in order to maintain the latch 10 in an open position. In an embodiment, the back spring 53 is a torsion spring. In an embodiment, the handle 32 and the link 18 are sized, shaped, and arranged so that rotation of the handle 32 in the direction of the arrow H (see FIG. 1) produces a force acting in the direction of the longitudinal axis A-A of the body 12. For instance, in an embodiment, a rotation of the handle 32 away from the exterior surface of the removable element (i.e., opening the latch 10) raises the hook member 14 off and away from the keeper (not shown in the Figures). Likewise, a rotation of the handle 32 towards the exterior surface of the removable element (i.e., closing the latch 10) moves the hook member 14 closer to the exterior surface of the removable element and onto the keeper (not shown in the Figures).

Figure 3:
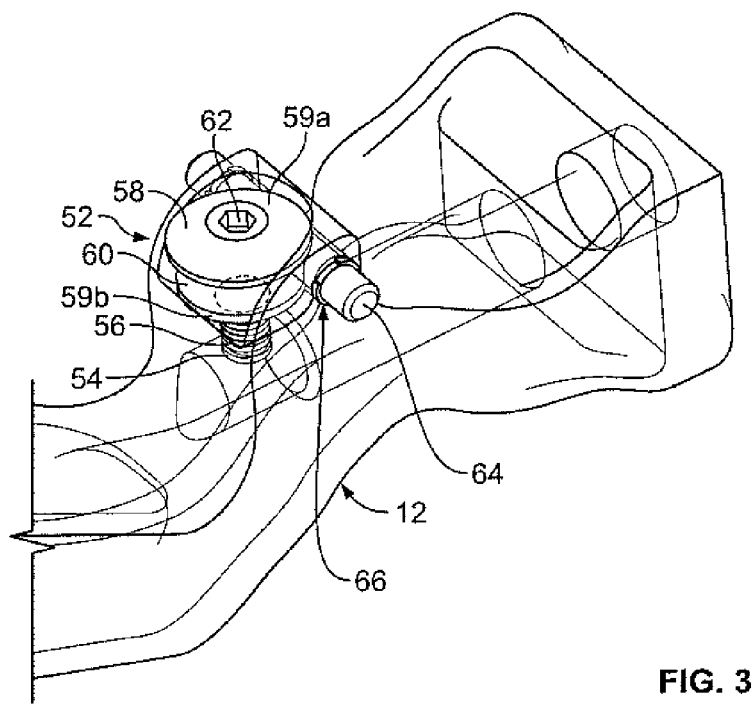
FIG. 3 is a cut-away perspective view showing Detail 3 of the latch shown in FIG. 1, which is shown in an enlarged scale, and a hook member employed by the latch being shown transparent for the purposes of clarity.

Referring now to FIGS. 1 through 3, in an embodiment, an adjustable screw 52 is threadedly installed in a threaded aperture 54 in the body 12, the screw's 52 longitudinal axis being obliquely oriented with the longitudinal axis A-A of the body 12. In an embodiment, the adjustable screw 52 includes a threaded shank 56, which threadedly engages the threaded aperture 54, and a thimble-shaped head 58 having a top portion 59a, a bottom portion 59b, and a concave side surface 60 formed within a periphery of the head 58 and between the top and bottom portions 59a, 59b. In an embodiment, the head 58 includes a hexagonal-shaped recess 62 for engagement with a tool, such as a standard hex wrench. In an embodiment, the recess 62 may consist of other shapes and sizes known in the art to receive a tool, e.g., cross, star, flat-head, etc. In an embodiment, a trigger-catch-pin 64 is movably mounted in a slot 66 of the body 12. In an embodiment, the trigger-catch pin 64 is retained by a pair of retaining rings 67 (one of which is shown in the Figures). In an embodiment, rotation of the adjustable screw 52 moves the trigger-catch-pin 64 closer to or further away from the longitudinal axis A-A of the hook-body 12. In an embodiment, the pin 64 engages the slot 51 of the detent 50. In an embodiment, the slot 66 is oriented so that the trigger-catch-pin 64 is retained against the concave side surface 60 of the adjustable screw 52 as the adjustable screw 52 is rotated.

In an embodiment, the body 12, the hook member 14, the link 18, the handle 32, the trigger 40, and the adjusting screw 52 are fabricated from stainless steel, but other suitable materials can be used. In an embodiment, all other structural elements that are depicted in FIGS. 1-3 may also fabricated from suitable grade stainless steel or other suitable alloy metal.

Figure 4:
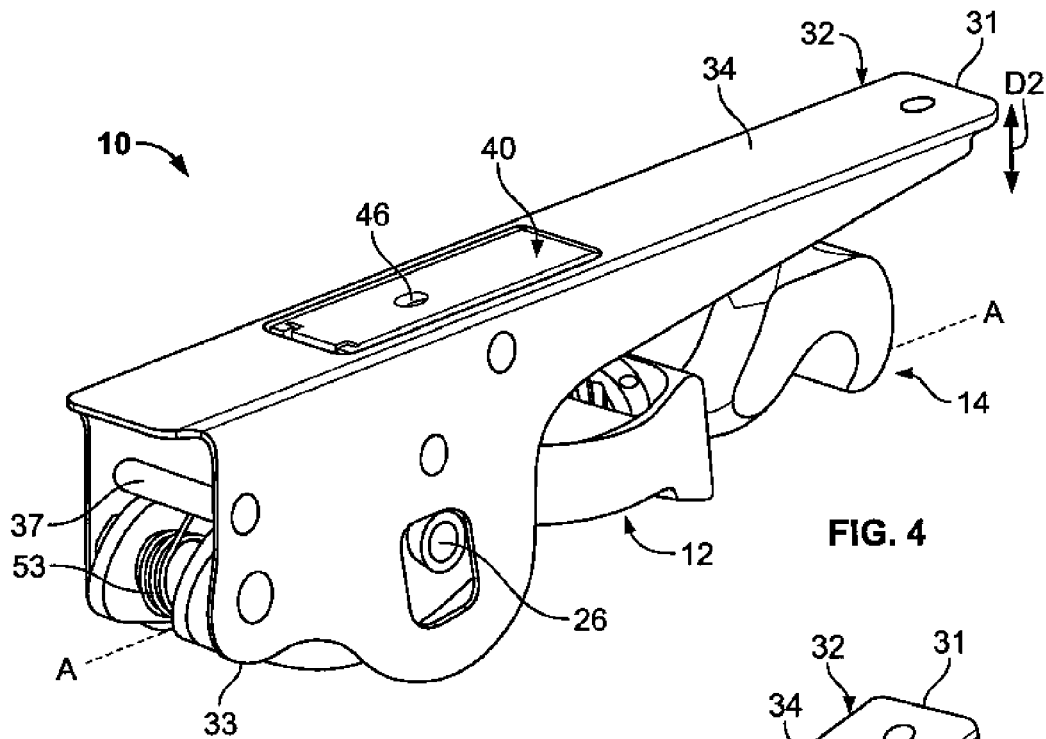
FIG. 4 is a top perspective view of the latch shown in FIG. 1, the latch being shown in the closed position.

In an embodiment, when the latch 10 is in its closed position (see FIG. 4), the access hole 46 in the trigger 40 is aligned with a corresponding access hole (not shown in the Figures) in the handle 32. In an embodiment, a user may then insert a tool from the exterior of the latch 10 (i.e., through the access hole 46 of the trigger 40 and the access hole of the handle 32) into the recess 62 of the adjustable screw 52. In an embodiment, rotation of the adjustable screw 52 by the tool moves the trigger-catch-pin 62 in directions D2, i.e., closer to or further away from the longitudinal axis A-A of the hook-body 12. In this manner, the user may adjust the orientation of the first end 31 and, in turn, the exterior surface 34 of the handle 32 so that the exterior surface 34 is flush with the exterior surface of the removable element (not shown in the Figures). In an embodiment, the adjustment may be conveniently made at the time of the installation of the latch 10 or at any time thereafter, without the time consuming process of adjusting or shimming the keeper. In an embodiment, the first end 31 of the handle 32 may be adjusted in a range of approximately ±0.040 inch (±1 mm) when the adjustable screw 52 is turned. In other embodiments, the first end 31 of the handle 32 may be adjusted in a range greater or less than ±0.040 inch.

Figure 5:
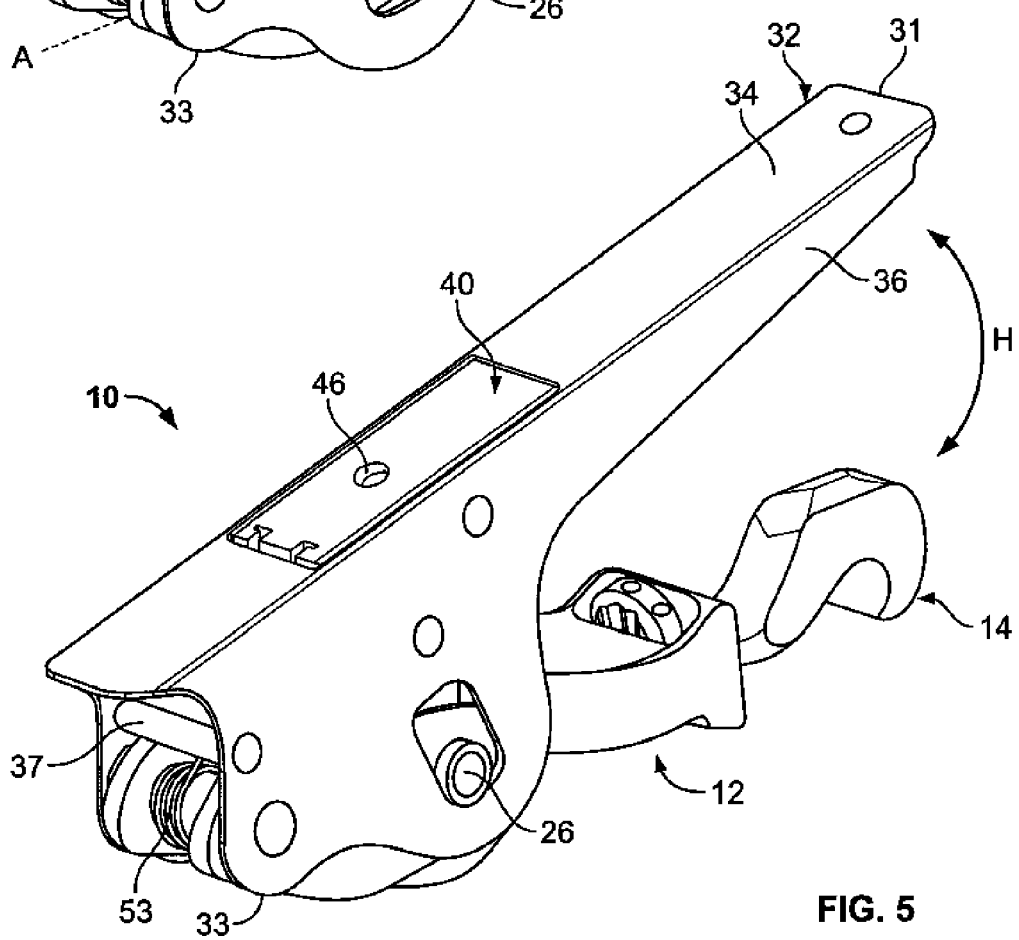
FIG. 5 is a top perspective view of the latch shown in FIG. 1, the latch being shown in a released, free travel position.

In an embodiment, the latch 10 is opened by pressing the trigger 40, wherein the tip 50 of the trigger 40 is released from the trigger-catch-pin 64 and the pin 64 disengages the slot 51, freeing the handle 32 to rotate outwardly from the exterior surface of the removable element to a released, free travel position (see FIG. 5). In an embodiment, when the trigger 40 is pushed, the handle 32 automatically and freely opens via the back spring 53. In an embodiment, the handle 32 opens up to its released, free travel position at an angle of approximately 13° measured from the axis A-A. In other embodiments, the handle 32 can open up to greater or smaller angles in order to provide sufficient room for a user to grab the handle 32. In an embodiment, the handle 32 may then be further rotated in the direction of the arrow H away from the exterior surface of the removable element in the manner described hereinabove. In an embodiment, the back spring 53 maintains the handle 32 in its open position.

It will be understood that the embodiments described herein are merely exemplary and that a person skilled in the art may make many variations and modifications without departing from the spirit and scope of the invention. For instance, in an embodiment, a pin adjustment mechanism (not shown) that is similar to the adjustment mechanism 16 described hereinabove (see FIGS. 1 and 2) may be installed on the hook member 14 in place of the adjustment screw 52. More particularity, in an embodiment, such an adjustment mechanism can be operated (i.e., while the latch 10 is in the open position) to move the position of the trigger-catch-pin 64 closer to or further away from the body 12. In an embodiment, the latch 10 may be used for doors and access panels for aircraft, such as fuselages, nacelles, etc. In other embodiments, the latch 10 can be used in other suitable environments and for other vehicles and structures. In other embodiments, the latch 10 can be configured as a pin latch or other suitable latch. All such variations and modifications are intended to be included within the scope of the invention as defined in the appended claims.

What is claimed is:

1. A latch, comprising:
   a body having a first end and a second end opposite the first end, a trigger-catch-pin, and a pin adjustment mechanism for adjusting the position of the trigger-catch-pin within the body, the pin adjustment mechanism including an adjustable screw threadedly attached to the body, the adjustable screw including a head having a top portion, a bottom portion, and a concave side surface formed within a periphery of the head between the top and bottom portions, wherein the trigger-catch-pin of the body is retained against the concave side surface; and
   a handle having a first end and a second end opposite the first end of the handle, an exterior surface, and a trigger, wherein the second end of the handle is attached pivotally to the body such that the handle is moveable between a closed position, in which the trigger of the handle is releasably engaged with the trigger-catch-pin of the body, and an open position, in which the trigger of the handle is disengaged from the trigger-catch-pin of the body,
   wherein when the handle is in its closed position, the pin adjustment mechanism is adapted to adjust the position of the trigger-catch-pin within the body and, in turn, the position of the first end of the handle relative to the body, such that when the adjustable screw is rotated threadedly in a first direction, the first end of the handle is urged towards the body, and wherein when the adjustable screw is rotated threadedly in a second direction opposite the first direction, the first end of the handle travels away from the body.

2. The latch of claim 1, wherein the latch is adapted to be mounted to a structure, and wherein the pin adjustment mechanism is adapted to adjust the handle so that the exterior surface of the handle is flush with an external surface of the structure.

3. The latch of claim 1, wherein the body includes a hook member extending from the second end of the body.

4. The latch of claim 3, wherein the hook member includes a threaded shaft attached threadedly to the second end of the body.

5. The latch of claim 4, wherein the body includes a hook adjustment mechanism for movably adjusting the hook member between an extended position and a retracted position.

6. The latch of claim 1, wherein the trigger of the handle includes a top portion having an access hole formed therein for providing external access to the adjustable screw.

7. The latch of claim 6, wherein the trigger of the handle includes a detent that releasably engages the trigger-catch-pin of the body.

8. The latch of claim 2, wherein the body includes a mounting bolt for mounting the latch to the structure.

9. The latch of claim 1, further comprising a link for attaching pivotally the second end of the handle to the first end body.

10. The latch of claim 9, wherein the link includes at least one pivot pin.

11. The latch of claim 10, further comprising a torsion spring engaged with the body and the handle for maintaining the handle in its open position.

* * * * *

UNITED STATES PATENT AND TRADEMARK OFFICE
CERTIFICATE OF CORRECTION

Page 1 of 1

PATENT NO. : 8,864,185 B2
APPLICATION NO. : 13/043717
DATED : October 21, 2014
INVENTOR(S) : Thai Do It is certified that error appears in the above-identified patent and that said Letters Patent is hereby corrected as shown below:

Title page, item [57] in the Abstract: Line 1, insert --a-- between "having" and "first;";

In the Specification

Column 1, line 38, delete "an," replace with --a--;

Column 3, line 48, delete "an," replace with --and--;

Column 4, line 26, insert --be-- between "also" and "fabricated.".

Signed and Sealed this
Twelfth Day of May, 2015

Michelle K. Lee
*Director of the United States Patent and Trademark Office*